US008159367B2

(12) United States Patent
Hofer et al.

(10) Patent No.: US 8,159,367 B2
(45) Date of Patent: Apr. 17, 2012

(54) METHODS FOR NOISE VALIDATED PHASE RANGING RFID LOCATION (75) Inventors: Russell Hofer, St. Louis, MO (US); Graham P. A. Bloy, St. Louis, MO (US)

(73) Assignee: RF Controls, LLC, St. Louis, MO (US)

( * ) Notice: Subject to any disclaimer, the term of this patent is extended or adjusted under 35 U.S.C. 154(b) by 374 days.

(21) Appl. No.: 12/625,219

(22) Filed: Nov. 24, 2009

(65) Prior Publication Data
US 2011/0090061 A1  Apr. 21, 2011

Related U.S. Application Data (63) Continuation-in-part of application No. 12/580,365, filed on Oct. 16, 2009.

(51) Int. Cl.
*G08C 19/16* (2006.01)

(52) U.S. Cl. .......... 340/870.26; 340/10.1; 340/10.2; 340/10.3; 340/10.4; 340/10.5; 340/572.1; 340/572.2; 340/572.3; 340/572.4; 340/5.1; 340/5.2; 340/5.3; 340/5.4; 340/5.5; 342/42; 342/51; 342/118; 342/125

(58) Field of Classification Search ........... 340/5.1–5.6, 340/10.1–10.5, 572.1–572.9, 825.73; 342/40, 342/51, 118, 125
See application file for complete search history.

(56) References Cited

U.S. PATENT DOCUMENTS

| 7,511,662 | B2 | 3/2009 | Mathews et al. |
| 2005/0280504 | A1 | 12/2005 | Pettus |
| 2006/0012521 | A1 | 1/2006 | Small |
| 2006/0044147 | A1 | 3/2006 | Knox et al. |
| 2006/0050625 | A1 | 3/2006 | Krasner |
| 2006/0232467 | A1 | 10/2006 | Small |
| 2007/0040739 | A1 | 2/2007 | Small |
| 2007/0041427 | A1 | 2/2007 | Small |
| 2007/0100548 | A1 | 5/2007 | Small |
| 2009/0224045 | A1 | 9/2009 | Toda et al. |
| 2009/0224873 | A1 | 9/2009 | Puskala et al. |
| 2009/0231140 | A1 | 9/2009 | Hong et al. |

(Continued)

FOREIGN PATENT DOCUMENTS
EP   1462989   9/2004
(Continued)

OTHER PUBLICATIONS

Gonzalez Moreno, J: Extended European Search Report for EP application No. 08789680.9, European Patent Office, Apr. 12, 2011 (transmitted Apr. 19, 2011), Munich DE.

(Continued)

*Primary Examiner* — George Bugg
*Assistant Examiner* — Ojiako Nwugo
(74) *Attorney, Agent, or Firm* — Babcock IP, PLLC (57) ABSTRACT A method and apparatus for validating a distance output of a phase ranging RFID location system, based upon the phase readings included in data sets obtained from monitoring reply signals corresponding to interrogation signals at multiple frequencies and a common interrogation signal beam direction; by comparison of measured phase and frequency data sets with theoretical phases calculated with respect to the same frequencies over a range of positions corresponding to a beam extent of the interrogation signal. The distance output validated by comparison with theoretical threshold data processed to generate an extreme values distribution from which a cumulative distribution function is extracted and against which a confidence level is applied.

20 Claims, 7 Drawing Sheets

U.S. PATENT DOCUMENTS

2009/0237253 A1  9/2009  Neuwirth
2009/0256750 A1  10/2009  Mathews et al.
2010/0039228 A1* 2/2010  Sadr et al. .................... 340/10.1

FOREIGN PATENT DOCUMENTS

WO    PCT2009/035723    3/2009

OTHER PUBLICATIONS

Extended European Search Report, related to application EP10186756.2, issued Jan. 14, 2011 by European Patent Office, Munich.

* cited by examiner

METHODS FOR NOISE VALIDATED PHASE RANGING RFID LOCATION

CROSS REFERENCE TO RELATED APPLICATIONS

This application is a continuation-in-part of commonly owned co-pending U.S. Utility patent application Ser. No. 12/580,365, titled "Phase Ranging RFID Location System" filed Oct. 16, 2009 by Russell Hofer and Graham P. Bloy, hereby incorporated by reference in its entirety.

BACKGROUND

1. Field of the Invention

The invention relates to touch free identification, location and/or tracking systems. More particularly, the invention relates to an RFID identification, location and/or tracking system utilizing noise validated phase ranging to determine the distance of a target RFID from the system antenna.

2. Description of Related Art

Commonly owned PCT Patent Application Publication WO 2009/035723, titled "Radio Frequency Signal Acquisition and Source Location System" by Bloy et al published Mar. 19, 2009, hereby incorporated by reference in its entirety, discloses a real-time RFID location system that utilizes an Intelligent Tracking and Control System (ITCS) coupled to one or more intelligent scanning antenna Signal Acquisition and Source Location (SASL) modules (an ITCS installation) to enable the accurate 3-dimensional location of RFID tags arbitrarily placed and/or moving through a defined target area (volume). Touch free Identification, location and/or tracking systems such as the ITCS object identification systems disclosed in WO 2009/035723 enable the identification and location of tags and/or tagged items, attributing significance to the appearance, disappearance, location or co-location of tags or tagged items and thereby facilitating better business process decisions.

A SASL steerable phased array antenna may be configured to provide highly accurate interrogation beam direction feedback, enabling identification of a vector through the volume upon which a target RFID may be located. However, ranging of the distance from the antenna to the position along the beam where the target RFID is located, to enable three-dimensional location of the target RFID within the volume, is impossible without further inputs.

When provided with further data storage/processing capabilities, an RFID location system such as disclosed in WO 2009/035723 can be further enhanced to monitor tagged and/or untagged objects via RF environmental fingerprint monitoring and analysis as disclosed in U.S. patent application Ser. No. 12/395,595, titled "Radio Frequency Environment Object Monitoring System and Methods of Use", filed Feb. 29, 2009 by Bloy, hereby incorporated by reference in its entirety.

An ITCS installation typically includes multiple SASL to provide high precision triangulation data for RFID location calculations. However, an optimal multiple SASL configuration requires a volume configured such that each of the SASL can scan the entirety of the volume from separate mounting locations. Barriers and/or products in a typical volume at any moment during use may create obstructed scanning areas for one or more of the SASL, preventing the scanning of a target RFID by at least two SASL and thus inhibiting interrogation signal beam intersection triangulation location of the target RFID. Further, costs for multiple SASL hardware, installation and maintenance may become significant.

WO 2009/035723 also discloses alternative methods for RFID range location utilizing a single SASL, such as signal transmit/receive timing, Return Signal Strength Indication (RSSI), ghost signal analysis and/or multiple signal averaging. However, location accuracy utilizing these alternative methods may be less than satisfactory where RFID location with high precision is desired.

Therefore, it is an object of the invention to provide an object monitoring solution that overcomes deficiencies in the prior art. A further object of the present invention is to facilitate ease of configuration, operation reliability and maintenance of RFID object location systems.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Through investigation of the operational parameters of RFID object location systems, the inventors have recognized that analysis of the phase of the received signal from a target RFID over multiple interrogation frequencies can provide ranging of the target RFID distance along the interrogation signal beam with significant precision.

Phase ranging as used herein is the procedure of calculating the distance a tag is from the RFID location system antenna along the interrogation signal beam, based upon the phase readings included in the data set(s) obtained for each frequency at the same steering angle.

Figure 1:
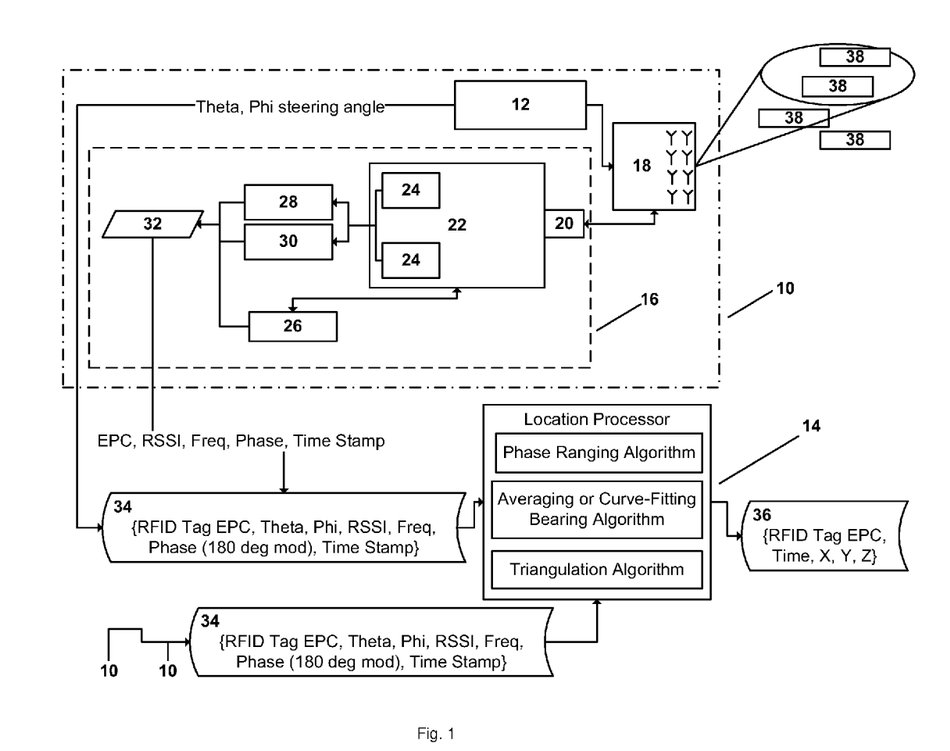
FIG. 1 is a schematic block diagram of an exemplary RFID object location system.

FIG. 1 demonstrates an exemplary RFID location system with signal phase detection and phase ranging capability. The intelligent steerable phased array antenna module 10 is demonstrated with a beam steering unit 12 under the control of a location processor 14. An RFID reader module 16 directs an interrogation signal to and receives corresponding signals from the steerable phased array antenna 18 through the RF port 20 of a multi-frequency transceiver 22. The transceiver 22 processes the desired signals through digital to analog transmit and analog to digital receive converters 24 for each of transmit and receive signal paths according to control instructions from a protocol processor 26.

The RFID reader module 16 includes a phase detection circuit 28 that provides phase data and/or determines a phase differential between a phase of the interrogation signal and the phase of the corresponding received signal. Because of ambiguity in measuring the phase information in homodyne receivers, the phase measurement result may be limited to a range of 0 to 180 degrees, the modulus of the phase of the backscatter signal at the receiver. Alternatively, phase ranging procedures described herein also accommodate an input phase of −180 to +180 (0 to 360) degrees.

Further signal analysis within the RFID reader module is performed by an amplitude processing circuit 30 and an RFID tag singulation circuit 32 whereby for each RFID tag scan an Electronic Product Code (EPC) or other tag identifier, RSSI, frequency, phase and a time stamp can be output for further processing by the ITCS and/or location processor. A supplier of an RFID reader module 16 including phase detection capability is Sirit Inc. of Toronto, Canada. Beam steering angle information such as Theta and Phi received from the beam steering unit 12 may also be associated with each RFID tag scan and a combined data set 34 representing each RFID tag scan stored at the location processor 14. Additional intelligent steerable phased array antenna module(s) 10 may also be included, each delivering a data set 34 to the location processor 14. An output 36 of the location processor 14 comprises the tag identifier, time stamp and three dimensional location of the associated RFID tag 38.

The transceiver 22 is preferably provided with frequency hopping capability to enable multiple high speed RFID tag 38 scans over a range of frequencies, for example between 902 to 928 Mhz, at the same beam steering angle, generating a data set for each frequency. Frequency hopping may be, for example with steps of 100, 250 or 500 kHz, resulting in 250, 100 or 50 steps over the frequency range. Government radio frequency regulations may require a minimum frequency hopping rate of 50 frequency changes within 20 seconds. Faster frequency changes may enable increased scanning/calculation speeds.

Figure 2:
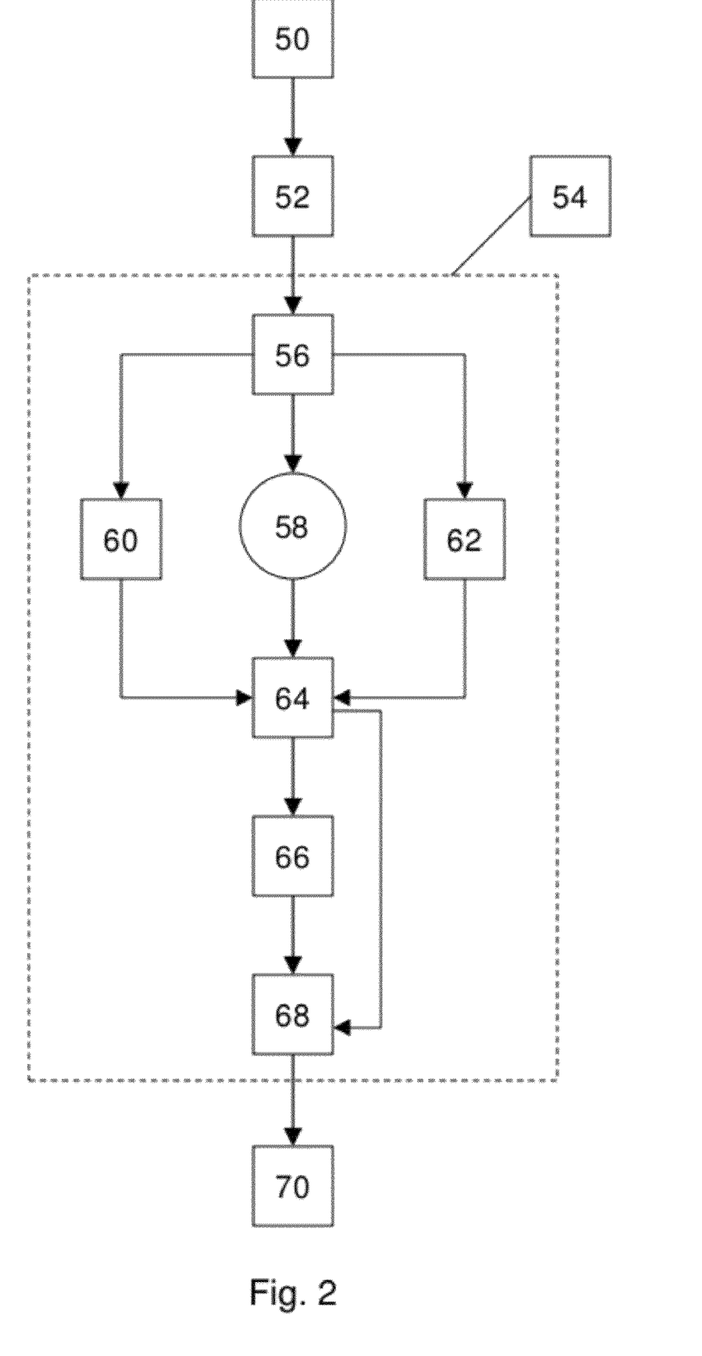
FIG. 2 is a schematic process diagram for noise validated phase ranging.

Methods for phase ranging are described in detail with the aid of a general process flow chart, as shown in FIG. 2. At 50, a plurality of data set(s) 34 are gathered by directing the interrogation signal beam through a scan of the volume. The scan may be for example a raster scan or other sweep pattern, for example prioritized by prior data identifying the locations of RFID tag(s) 38. The scan may be performed at a single scan frequency, interrupted upon reception of a reply signal from an RFID tag 38 whereupon a plurality of readings are repeated over a range of different frequencies along the same beam direction. Alternatively, the scan may be performed with continuous frequency hopping, enabling application of maximum signal strength with applicable governmental RF transmitter regulations.

As the interrogation signal beam encounters an RFID tag 38, a reply signal is received by the antenna identifying the presence of the RFID tag along the beam that triggers a data capture of the data set 34 corresponding to the RFID tag scan, for example: an Electronic Product Code (EPC) or other tag identifier, RSSI, frequency, phase and a time stamp. Further interrogation signals along the same beam are performed at additional frequencies, recording a data set 34 for each interrogation signal frequency. The phase of the rf component of the, for example backscatter modulation, reply signal is included in each data set 34. As the interrogation signal frequency is varied, the phase of the received reply signal will change. The data set(s) 34 may be grouped by tag identifier, creating a data matrix for further processing, including deriving the three dimensional position of each RFID tag 38.

In a further embodiment, an RF environmental fingerprint according to U.S. patent application Ser. No. 12/395,595 may be associated with each of the data set(s) 34.

One skilled in the art will appreciate that the number of different interrogation signal frequencies applied to a single beam direction/RFID tag data set gathering directly impacts the resolution of the resulting distance calculation, in a trade-off with the additional time required to switch to, generate and process data for each interrogation signal frequency applied.

To apply phase ranging to the RFID tag scan data, for a beam direction at which an RFID tag 38 has been detected, the beam extent or a shorter segment of interest of the beam extent at the instant direction is derived, at 52.

Figure 3:
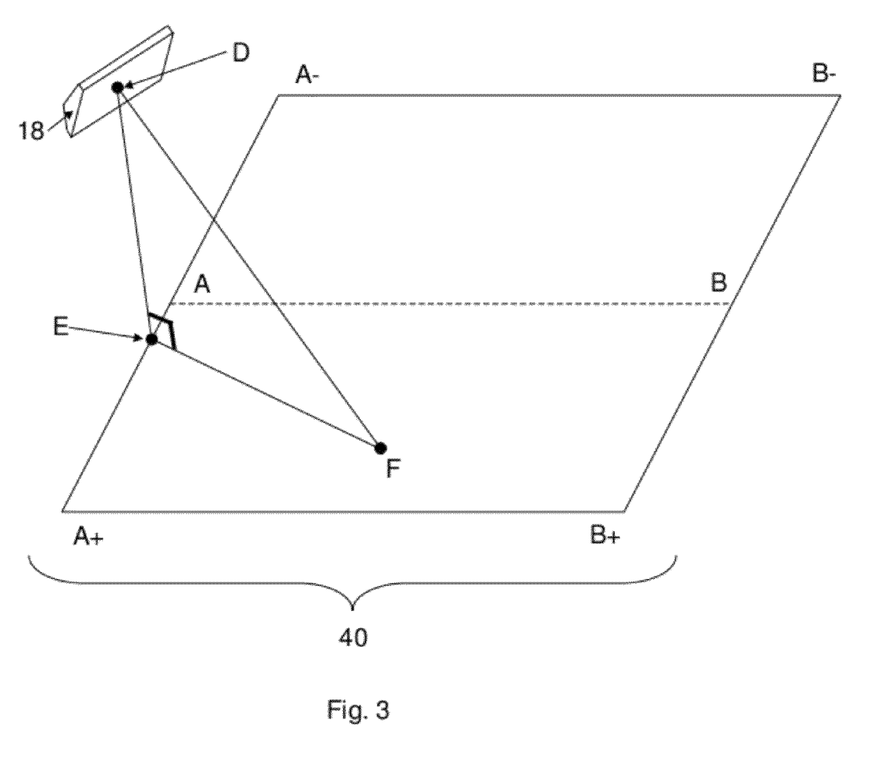
FIG. 3 is a schematic diagram demonstrating a beam extent within a volume perimeter.

In a typical installation, a perimeter of the volume 40 is specified and the position of the antenna 18 with respect to the volume 40 is also known. For any beam angle the intersection of the beam with the perimeter of the volume 40 such as the floor and/or sidewalls may be calculated by trigonometry. The floor and/or sidewalls may be physical or logical portions and/or barriers, including for example the perimeter of desired exclusion area(s) from which it is known that RFID tag(s) 38 will be excluded and/or that identify locations wherein RFID tag 38 tracking is not desired. Once the co-ordinates of the endpoint of the beam have been calculated, the beam length may also be calculated. For example as shown in FIG. 3, when the beam is swept in azimuth A− to A+ (i.e. from left to right) and successively moved in elevation towards B, a raster scan of the floor covering a volume defined by A−, A+ to B−, B+ is performed. At any instance during the scan a right angle triangular figure may be drawn comprising a vertical line from a point D at the centre of the antenna dropping perpendicular to the floor to point E, a line running from D to a point of intersection with the floor F representing the centre of the antenna interrogation beam, and a horizontal line along the floor connecting E and F. As the beam is swept across the floor the length of the line DF, the beam extent, will vary as will the included angle of intersection DF and EF.

The ends of the beam extent identified at 52 may be referenced as MIN and MAX, representing the minimum distance and the maximum distance, respectively, that the present RFID tag 38 is expected to be from the antenna, along the present beam direction.

Further refinements may be applied that reduce overall processing times and also improve noise immunity. For example, the distances of MIN and MAX may be reduced to a high probability range by utilizing signal timing and/or RSSI data of the data sets to reduce the theoretical length of the beam extent. If signal timing indicates a short or long period between launch of the interrogation signal and reception of the backscatter modulation from the target RFID tag a segment of the beam extent closer and/or farther away from the antenna 18 may be prioritized for examination. Similarly, if the RSSI reading is higher and/or lower, this may be interpreted as an indication that the range of possible locations of the target RFID along the signal beam is closer and/or farther away.

Figure 4:
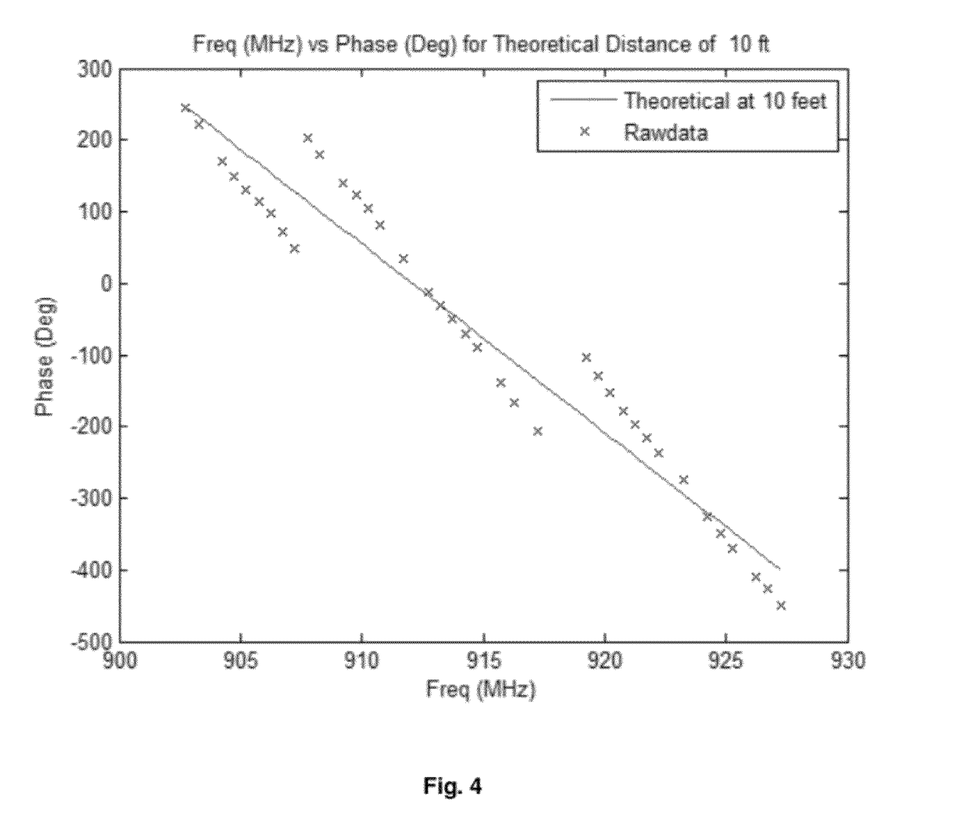
FIG. 4 is a chart of exemplary phase data over a range of frequencies with a theoretical phase line overlay, calculated for a distance of 10 feet.

Phase ranging along the beam extent is performed at 54. Because the tag distance from the antenna 18 along the signal beam is not known to begin with, an arbitrary distance is assumed, such as the MIN, MAX, a midpoint or other function of the present beam extent. In this example, an exemplary distance of MIN=10 feet is selected. As output by the RFID reader module, the recorded phase information is the modulus of 180 degrees. As the data set(s) are plotted with respect to phase and frequency, as shown in FIG. 4, it will be noticed that there are three lines of data spaced 180 degrees apart at their origin. This is because, the phase is recorded with reference to the initial frequency phase result and subsequent phase measurements are adjusted by adding or subtracting multiples of 180 degrees if they deviate from the theoretical phase (see below) by more than 90 degrees. Thereby, the phase is adjusted so that the result best agrees with the theoretical phase reading.

Theoretical phase=phase at min Freq−(freq(Hz)−min Freq)*distance(ft)*360(deg)/c(ft/s)*2

At 56, the signal processor generates a theoretical dataset comprising the phase of a backscatter signal for each frequency and for a set of theoretical tag distances in the range of MIN to MAX. This theoretical line, data points calculated for example by calculating theoretical phase for a range of distances is shown in FIG. 4 for the assumed tag distance of 10 feet. It will be noticed that the theoretical line has a different slope than the actual phase measurements of the tag. The origin of the theoretical line may be selected as the first phase versus frequency data set co-ordinates taken so that the origins of the actual raw data and the theoretical lines coincide, which simplifies calculations.

At 58, the signal processor performs an iterative loop on the data set(s) 34 of each detected RFID tag in order to determine a best fit to the theoretical phase, which identifies the distance of the RFID tag along the signal beam from the antenna 18. Instead of calculating the theoretical distance/overlay slope differential associated with each available frequency data set 34 in sequence, comparisons between representative theoretical distances corresponding to the available range of frequency data sets(s) 34 may be made to identify a converging theoretical distance range of interest, for example via slope comparison and/or plus/minus indication of the slope differential from the theoretical result for the associated distance, wherein the available frequency data set(s) 34 within the converging theoretical distance range are then reviewed for best fit.

Figure 5:
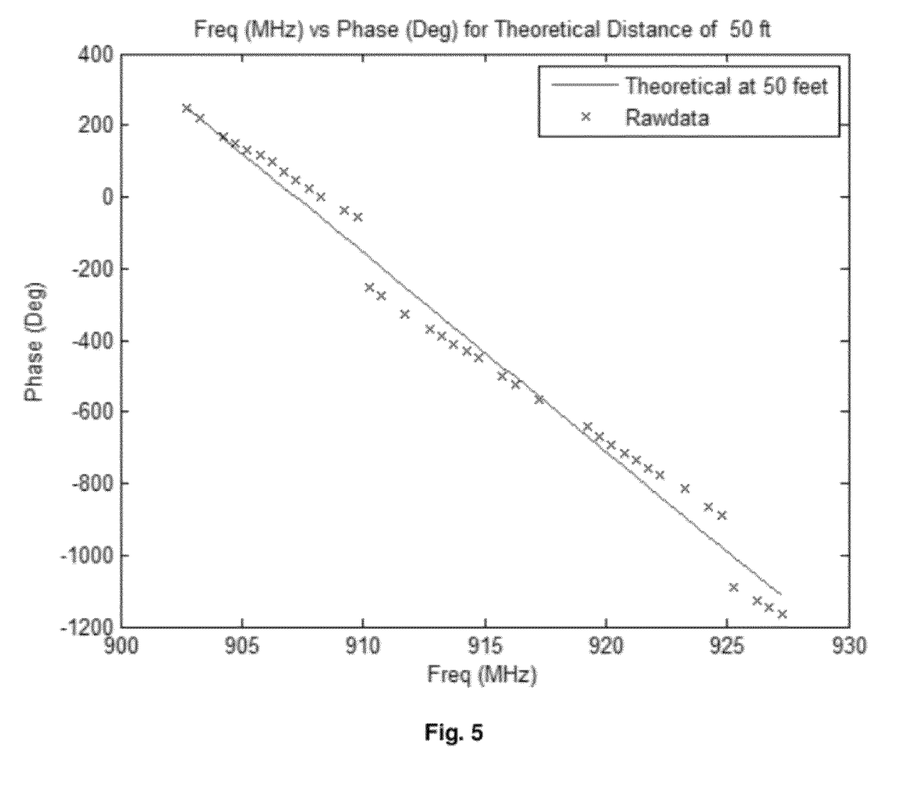
FIG. 5 is a chart of exemplary phase data over a range of frequencies with a theoretical phase line overlay, calculated for a distance of 50 feet.
Figure 6:
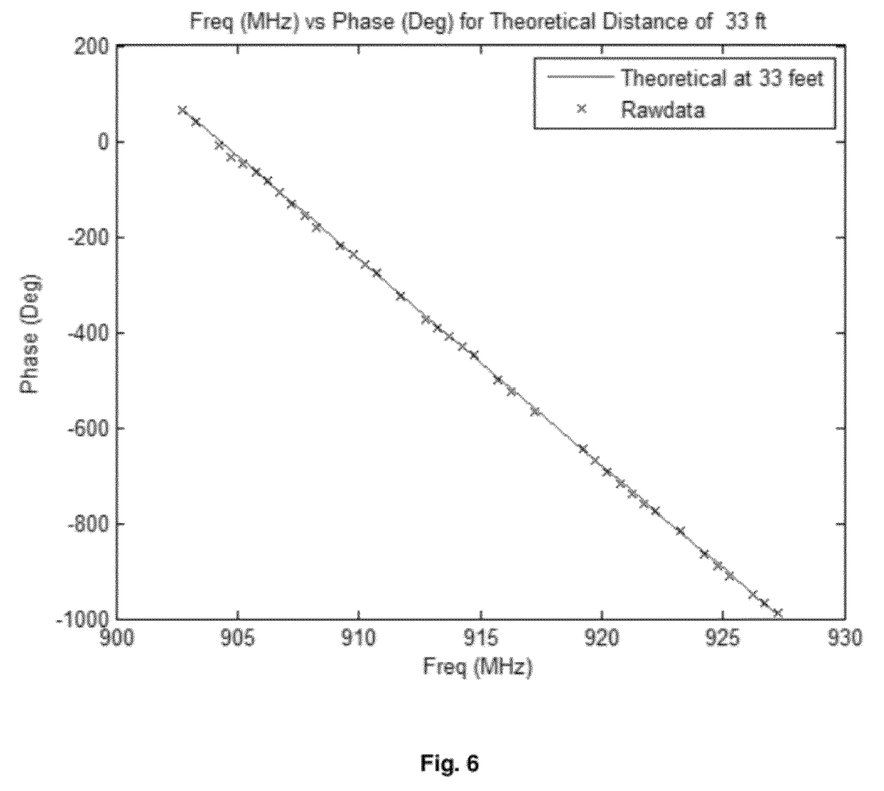
FIG. 6 is a chart of exemplary phase data over a range of frequencies with a theoretical phase line overlay, calculated for a distance of 33 feet.

The iterative loop generates the theoretical line with respect to each of a number of distances between MIN and MAX. As demonstrated by FIGS. 4, 5 and 6, if the actual distance is greater than the theoretical distance, then the slope of the recorded data will be greater than the theoretical and if the actual distance is less than the theoretical distance, then the slope will be less (more shallow) than the theoretical.

The recorded data is then overlaid on the theoretical data for each distance step. At some distance the slope of the recorded data and the slope of the theoretical data will at least be parallel and will typically coincide provided that the origins of both are the same. In the present data set example, this is demonstrated in FIG. 6. Therefore, in the present example the distance of the RFID tag along the signal beam from the antenna 18 is 33 ft, the theoretical distance applied to generate FIG. 6, the best slope fit of the data set(s) 34 provided in this example.

In a refinement of the iterative method to speed up the location process, a converging iterative process may be used whereby the theoretical distance is first calculated for a distance less than the assumed distance of the tag and then for a distance greater than the assumed distance of the tag. By comparing the slopes of the data set between the measurements, it is possible to exclude numerous data set 34 calculations and rapidly converge on the actual distance using known mathematical techniques.

As several adjustments described herein above are made to the data for best fit/ease of processing, it is possible for random and/or noisy data to indicate an improper distance that the system outputs as an apparently acceptable result.

To minimize the chance of a distance output resulting from random and/or noisy data, validity of the resulting distance obtained from phase ranging may be tested via additional verification steps. A verification of the result may be performed at 64, operating upon the result of data integrity calculations performed at 60 and 62. For speed of execution, these calculations may be performed in parallel with the best fit processing in 58. In 60, a Sum of Square Error (SSE) value is calculated by taking the theoretical phases and subtracting each from the corresponding measured data between MIN and MAX, squaring, and summing across all measurements. In 62, a Sum of Square Total (SST) is calculated with respect to a horizontal line (slope=0, indicating a distance of 0) by taking the 'theoretical phase', subtracting it from the adjusted raw data, squaring, and summing across all measurements. With the SSE and SST inputs from 60 and 62, an R_rawData (64) indication of fit may be calculated by:

$$R\_rawData(64)=1-SSE/SST$$

Where an R_rawData (64) approaching 1 is indicative of a good fit and an R value approaching 0 is a poor fit. An error source in the calculations may be the presence of RF noise sources, an RFID tag 38 that was moving during data acquisition and/or the broad phase averaging applied as the data set 34 is generated.

At 66, to determine if unacceptably noisy and/or averaged out of range data has been utilized, the phase ranging steps 56-64 may be repeated using uniformly distributed phases ranging from 0 to 360 degrees, instead of actual data set 34 data, the results stored in an array of R_randomData Array (66).

Alternatively, the array of R_rawData (64) indication of fit may be populated with any indication believed to reflect relative fit of each measurement with respect to the remainder of measurement(s) that have been obtained.

Figure 7:
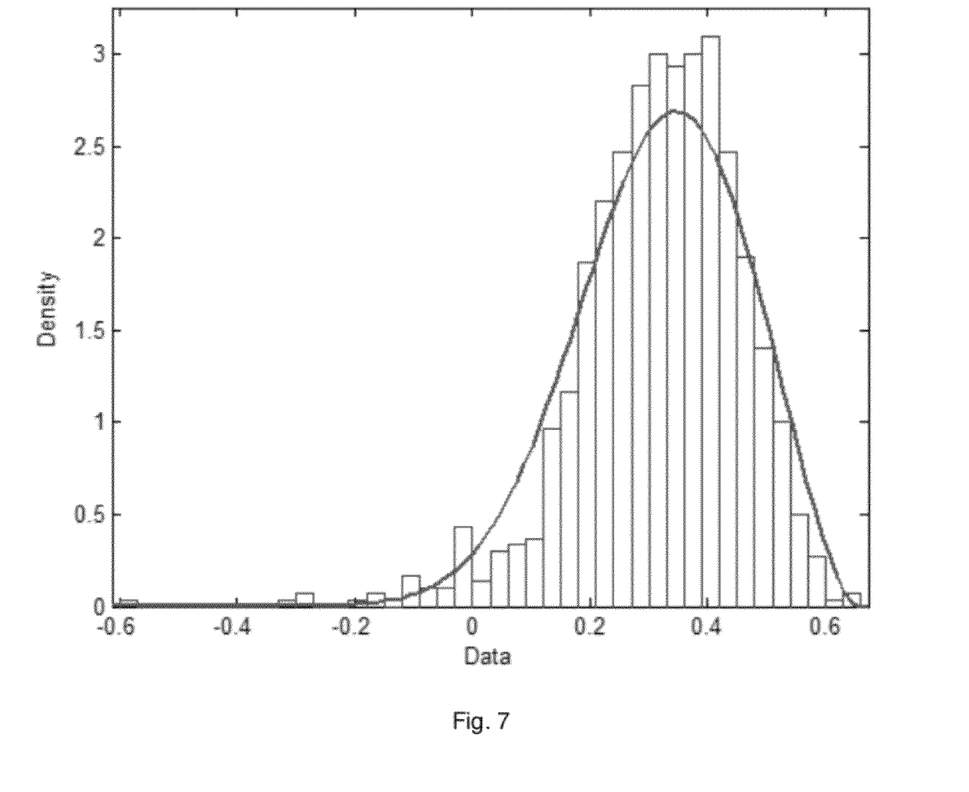
FIG. 7 is a histogram of 1000 iterations of R_randomData Array (66) values.

At 68, an analysis of the R_randomData Array (66) may be performed to provide guidance for an acceptable threshold value for R_rawData (64). When processed analogous to reviewing the R_randomData Array (66) data points with respect to density of occurrence, for example as visualized in a histogram format as shown in FIG. 7, the R_randomData Array (66) values may be applied to an extreme values distribution from which a cumulative distribution function is obtained. Thereby, the number of iterations applied to generate R_randomData Array (66) may be reduced. Note the highest value in the example appears in FIG. 7 as slightly more than 0.6. Applying a confidence level, for example of 99.9% (the position along the histogram where 99.9% of the data points are to the left) provides a Threshold_R_rawData value, in the present example proximate 0.6, against which the R_rawData from 64 may be measured with a high level of confidence.

At 70 if: R_rawData (64)>Threshold_R_rawData, the phase ranging result is accepted and a corresponding three dimensional position of the subject RFID tag 38 is output from the location processor 14 with the associated tag identifier and a time stamp. If R_rawData (64) fails to be greater than the Threshold_R_rawData, an alternative best guess, for example according to the procedures disclosed in WO 2009/035723 and/or an alarm may be output. Also, where multiple intelligent steerable phased array antenna module(s) 10 are providing data set(s) 34 to the location processor 14, the results of these separate phase ranging calculations may be compared as a further check. Where processing speed is not critical, multiple scan and calculation loops may be performed along the same beam direction to further verify the result and/or provide data for averaging of the resulting 70 output distance to generate a final result with a further improved confidence level.

When scanning for multiple RFID tag(s) 38, the processes described may take place for each RFID tag 38 found when a single beam direction has identified multiple RFID tag(s) 38, separated into unique data set(s) 34 by the tag singulation circuit 32 of the RFID reader module 16.

The phase ranging procedure has been described herein with respect to data gathered at a single interrogation signal beam direction. Because the interrogation signal beam has a generally conical aspect with a cross sectional area that varies with distance, an individual RFID tag 38 may be detected at multiple beam directions where the cross sectional area of the beam(s) overlap. To improve system response times, data set(s) 34 associated with multiple beam directions may also be utilized. To correct for phase differences resulting from the slightly different beam directions, a correction factor, for example determined during system configuration, may be added to the measured phase depending upon RSSI comparisons and/or mapping of adjacent beam direction data set(s) 34 that indicate which beam direction appears to be the centerpoint of the target RFID tag 38 location.

One skilled in the art will appreciate that the apparatus and systems disclosed provide significant equipment, installation and maintenance advantages over prior multiple antenna 18 triangulation and/or significant improvements in location precision compared to single antenna 18 tag location systems without phase ranging capability.

| Table of Parts | |
|---|---|
| 10 | intelligent steerable phased array antenna module |
| 12 | beam steering unit |
| 14 | location processor |
| 16 | RFID reader module |
| 18 | antenna |
| 20 | RF port |
| 22 | transceiver |
| 24 | converter |
| 26 | protocol processor |
| 28 | phase detection circuit |
| 30 | amplitude processing circuit |
| 32 | tag singulation circuit |
| 34 | data set |
| 36 | output |
| 38 | rfid tag |
| 40 | volume |

It will be appreciated by those skilled in the art that the invention is not restricted to the embodiments described herein but it may be applied to other similar applications involving the tracking, tracing and location of objects or items using RFID tags or other radio frequency transponders. Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A method for phase ranging in an RFID location system, comprising the steps of:

receiving a reply signal from an RFID tag when an interrogation signal beam at a frequency is pointed in a direction;

generating a data set corresponding to the reply signal including a measured phase of the reply signal and the frequency;

alternating the frequency between a plurality of frequencies and generating further data sets for each of a plurality of reply signals corresponding to the plurality of frequencies;

generating a theoretical phase with respect to each of the frequencies at each of a plurality of distances along the beam;

comparing a slope of a line through the theoretical phases at each of the frequencies at each of the plurality of distances with a slope of a line through the phase at each of the frequencies at each distance;

designating the distance at which the slope of the line through the theoretical phase with respect to each of the frequencies is closest to the slope of the line through the phase with respect to each of the frequencies as an output distance;

generating an R_rawData indication of fit;

replacing the measured phase data in the data set with a range of phases and processing in multiple iterations as generated to obtain R_rawData, to generate a corresponding array of R_randomData;

processing the array of R_randomData in an extreme values distribution to obtain a cumulative distribution function;

applying a confidence level to the cumulative distribution function to generate a Threshold_R_rawData; and accepting the output distance if the R_rawData is greater than the Threshold_R_rawData.

2. The method of claim 1; wherein R_rawData=1−SSE/SST;

where a SSE calculation generates an SSE as a sum of square error obtained by subtracting each of the theoretical phase from the measured phase corresponding to each frequency of the data set to obtain a measured data;

squaring the measured data and summing each of the measured data; and a SST calculation generates an SST as a sum of square total calculated with respect to a theoretical line of slope zero obtained by subtracting each of the theoretical phase, derived at distance zero, from the measured phase corresponding to each frequency of the data set to obtain a slope zero measured data;

squaring the slope zero measured data and summing.

3. The method of claim 1, wherein the range of phases that replace the measured phase data extend between 0 and 360.

4. The method of claim 1, wherein the confidence level is at least 99%.

5. The method of claim 1, wherein the cumulative distribution function is a histogram of the array of R_randomData and the confidence level is a position along a data axis where the desired percentage of the array of R_randomData is to the right of the position.

6. The method of claim 1, wherein the SSE calculation and the SST calculation is performed in parallel with the comparison of the slopes of the lines through the theoretical phases at each of the frequencies at each of the plurality of distances with the slopes of the lines through the phase at each of the frequencies at each distance.

7. The method of claim 1, wherein the theoretical phase is generated by the equation:

$$\text{theoretical phase} = ((\text{phase at min Freq} - \text{Freq}) * \text{distance} * 360)/(c*2),$$

wherein phase at min Freq is the phase corresponding to a minimum frequency of the data sets; Freq is the frequency corresponding to the frequency for which the theoretical phase is being calculated; distance is a distance for which the theoretical phase is being calculated and c is the speed of light.

8. The method of claim 1, further including the step of converting the output distance with respect to the direction into a three dimensional co-ordinate location of the RFID tag.

9. The method of claim 8, further including the step of comparing the three dimensional co-ordinate location of the RFID tag with an alternative three dimensional co-ordinate location corresponding to the RFID tag generated by an alternative data set from an alternative interrogation signal beam.

10. A method for phase ranging in an RFID location system, comprising the steps of:
generating multiple measured phase and frequency data sets for each of a plurality of reply signals corresponding to the plurality of frequencies;
generating a theoretical phase with respect to each of the frequencies at each of a plurality of distances along the beam;
comparing a slope of a line through the theoretical phases at each of the frequencies at each of the plurality of distances with a slope of a line through the phase at each of the frequencies at each distance;
designating the distance at which the slope of the line through the theoretical phase with respect to each of the frequencies is closest to the slope of the line through the phase with respect to each of the frequencies as an output distance;

generating an $R\_\text{rawData} = 1 - SSE/SST$;

where a SSE calculation generates an SSE as a sum of square error obtained by subtracting each of the theoretical phase from the measured phase corresponding to each frequency of the data set to obtain a measured data;
squaring the measured data and summing each of the measured data; and
a SST calculation generates an SST as a sum of square total calculated with respect to a theoretical line of slope zero obtained by subtracting each of the theoretical phase, derived at distance zero, from the measured phase corresponding to each frequency of the data set to obtain a slope zero measured data;
squaring the slope zero measured data and summing;

generating a $R\_\text{randomData} = 1 - SSE/SST$;

where a SSE calculation generates an SSE as a sum of square error obtained by subtracting each of the theoretical phase from a range of phases corresponding to each frequency of the data set to obtain a theoretical data;
squaring the theoretical data and summing each of the theoretical data; and a SST calculation generates an SST as a sum of square total calculated with respect to a theoretical line of slope zero obtained by subtracting each of the theoretical phase, derived at distance zero, from the range of phases corresponding to each frequency of the data set to obtain a slope zero theoretical data;
squaring the slope zero theoretical data and summing;
processing R_randomData in multiple iterations to generate a corresponding array of R_randomData;
processing the array of R_randomData in an extreme values distribution to obtain a cumulative distribution function;
applying a confidence level to the cumulative distribution function to generate a Threshold_R_rawData; and
accepting the output distance if the R_rawData is greater than the Threshold_R_rawData.

11. The method of claim 10, wherein the range of phases that replace the measured phase data extend between 0 and 360.

12. The method of claim 10, wherein the confidence level is at least 99%.

13. The method of claim 10, wherein the cumulative distribution function is a histogram of the R_randomData array and the confidence level is a position along a data axis of the histogram where the desired percentage of the R_randomData is to the right of the position.

14. The method of claim 10, wherein the SSE calculation and the SST calculation is performed in parallel with the comparison of the slopes of the lines through the theoretical phases at each of the frequencies at each of the plurality of distances with the slopes of the lines through the phase at each of the frequencies at each distance.

15. The method of claim 10, wherein the theoretical phase is generated by the equation:

$$\text{theoretical phase} = ((\text{phase at min Freq} - \text{Freq}) * \text{distance} * 360)/(c*2),$$

wherein phase at min Freq is the phase corresponding to a minimum frequency of the data sets; Freq is the frequency corresponding to the frequency for which the theoretical phase is being calculated; distance is a distance for which the theoretical phase is being calculated and c is the speed of light.

16. The method of claim 10, further including the step of converting the output distance with respect to the direction into a three dimensional co-ordinate location of the RFID tag.

17. The method of claim 16, further including the step of comparing the three dimensional co-ordinate location of the RFID tag with an alternative three dimensional co-ordinate location corresponding to the RFID tag generated by an alternative data set from an alternative interrogation signal beam.

18. A method for validating a phase ranging RFID location system output, comprising the steps of:
generating an R_rawData indication of fit;
replacing a measured phase data in a data set of measured reply signals with a range of theoretical phases and processing, according to a process of the phase ranging RFID location system which generated the phase ranging RFID location system output, to obtain R_rawData in multiple iterations, to generate a corresponding array of R_randomData;
processing the array of R_randomData in an extreme values distribution to obtain a cumulative distribution function;
applying a confidence level to the cumulative distribution function to generate a Threshold_R_rawData; and
accepting the output distance if the R_rawData is greater than the Threshold_R_rawData.

19. The method of claim 18, wherein R_rawData=1−SSE/SST;
- where a SSE calculation generates an SSE as a sum of square error obtained by subtracting each of the theoretical phase from the measured phase corresponding to each frequency of the data set to obtain a measured data;
- squaring the measured data and summing each of the measured data; and
- a SST calculation generates an SST as a sum of square total calculated with respect to a theoretical line of slope zero obtained by subtracting each of the theoretical phase, derived at distance zero, from the measured phase corresponding to each frequency of the data set to obtain a slope zero measured data;
- squaring the slope zero measured data and summing.

20. The method of claim 18, wherein the cumulative distribution function is a histogram of the R_randomData and the confidence level is a position along a data axis where the desired percentage of the R_randomData is to the right of the position.

* * * * *